United States Patent
Litwing et al.

(10) Patent No.: US 7,748,441 B2
(45) Date of Patent: Jul. 6, 2010

(54) MODULAR HEATING AND/OR AIR CONDITIONING SYSTEM FOR A MOTOR VEHICLE

(75) Inventors: Erich Litwing, Spraitbach (DE); Gebhard Schweizer, Leonberg (DE); Jürgen Heilemann, Wendlingen (DE); Wolfgang Dieksander, Filderstadt (DE)

(73) Assignee: BEHR GmbH & Co. KG, Stuttgart (DE)

(*) Notice: Subject to any disclaimer, the term of this patent is extended or adjusted under 35 U.S.C. 154(b) by 580 days.

(21) Appl. No.: 10/518,490

(22) PCT Filed: Jun. 23, 2003

(86) PCT No.: PCT/EP03/06575

§ 371 (c)(1),
(2), (4) Date: Dec. 20, 2004

(87) PCT Pub. No.: WO04/000589

PCT Pub. Date: Dec. 31, 2003

(65) Prior Publication Data

US 2006/0060343 A1   Mar. 23, 2006

(30) Foreign Application Priority Data

Jun. 21, 2002   (DE)   ................ 102 27 926

(51) Int. Cl.
  *B60H 1/00* (2006.01)
(52) U.S. Cl. .................... 165/204; 165/42; 165/202
(58) Field of Classification Search ............. 165/42–44, 165/202–204; 454/159, 160
See application file for complete search history.

(56) References Cited

U.S. PATENT DOCUMENTS

| 3,550,522 | A | * | 12/1970 | Bauer et al. ............... 454/144 |
| 4,512,239 | A | * | 4/1985 | Watanabe et al. .......... 454/144 |
| 5,042,566 | A | | 8/1991 | Hildebrand |
| 5,072,106 | A | * | 12/1991 | Osawa .................... 250/206.1 |
| 5,086,628 | A | * | 2/1992 | Hashimoto ................ 62/244 |
| 5,673,964 | A | | 10/1997 | Roan et al. |
| 5,803,160 | A | | 9/1998 | Danieau |
| 5,853,323 | A | | 12/1998 | Beck et al. |
| 5,878,806 | A | | 3/1999 | Denk et al. |
| 6,036,594 | A | * | 3/2000 | Kwon et al. .............. 454/156 |
| 6,189,801 | B1 | | 2/2001 | Klingler et al. |
| 6,230,795 | B1 | * | 5/2001 | Tsunooka et al. .......... 165/203 |
| 6,234,569 | B1 | | 5/2001 | Derleth et al. |
| 6,247,530 | B1 | * | 6/2001 | Mochizuki et al. ......... 165/204 |
| 6,305,462 | B1 | * | 10/2001 | Tsurushima et al. ........ 165/43 |
| 6,305,733 | B1 | | 10/2001 | Rahmstorf et al. |
| 6,449,535 | B1 | * | 9/2002 | Obradovich et al. ........ 701/1 |

(Continued)

FOREIGN PATENT DOCUMENTS

DE   39 11 615 A1   10/1990

(Continued)

*Primary Examiner*—Ljiljana (Lil) V Ciric
(74) *Attorney, Agent, or Firm*—Foley & Lardner LLP

(57) ABSTRACT

A heating or air conditioning system is used for a motor vehicle. The heating or air conditioning system may have a housing which is composed of several housing segments. At least one housing segment may be embodied as an insertion part which is inserted into the remaining housing after the remaining housing is mounted in the motor vehicle. The insertion part may have at least one functional module.

19 Claims, 4 Drawing Sheets

U.S. PATENT DOCUMENTS

| | | | |
|---|---|---|---|
| 6,463,998 B1 * | 10/2002 | Shindo | 165/204 |
| 6,482,081 B2 * | 11/2002 | Vincent et al. | 454/121 |
| 6,482,082 B1 * | 11/2002 | Derleth et al. | 165/204 |
| 6,629,424 B1 | 10/2003 | Araki et al. | |
| 6,659,358 B2 * | 12/2003 | Kamiya et al. | 236/49.3 |
| 6,736,190 B2 * | 5/2004 | Natsume et al. | 165/42 |
| 6,857,282 B2 * | 2/2005 | Shichiken et al. | 62/244 |
| 6,874,575 B2 * | 4/2005 | Kim | 165/204 |
| 6,881,140 B2 * | 4/2005 | Le | 454/156 |
| 6,925,825 B2 * | 8/2005 | Nakagawa et al. | 62/244 |
| 6,935,673 B1 | 8/2005 | Derleth et al. | |
| 6,979,259 B2 * | 12/2005 | Okazaki | 454/143 |
| 7,013,656 B2 * | 3/2006 | Yanagimachi et al. | 62/126 |
| 7,134,487 B2 * | 11/2006 | Kachi | 165/204 |
| 7,156,166 B2 | 1/2007 | Bendell et al. | |
| 2004/0016536 A1 * | 1/2004 | Auer et al. | 165/203 |
| 2004/0069483 A1 * | 4/2004 | Natsume et al. | 165/204 |

FOREIGN PATENT DOCUMENTS

| | | |
|---|---|---|
| DE | 195 35 263 A1 | 4/1996 |
| DE | 44 42 000 A1 | 5/1996 |
| DE | 197 03 519 C1 | 4/1998 |
| DE | 197 49 067 A1 | 5/1999 |
| DE | 197 51 652 A1 | 5/1999 |
| DE | 198 22 173 A1 | 11/1999 |
| DE | 198 54 940 A1 | 5/2000 |
| DE | 199 09 663 A1 | 9/2000 |
| DE | 199 55 616 C1 | 11/2000 |
| DE | 199 55 221 A1 | 5/2001 |
| DE | 100 37 384 A1 | 2/2002 |
| DE | 696 30 560 T2 | 9/2004 |
| EP | 0 392 296 A1 | 10/1990 |
| EP | 0 397 997 B1 | 11/1990 |
| EP | 0 838 356 B1 | 4/1998 |
| EP | 0 917 973 A2 | 5/1999 |
| EP | 0 799 734 B1 | 4/2003 |
| FR | 2 742 383 A1 | 6/1997 |
| JP | 9-132023 | 5/1997 |
| JP | 10-278546 A | 10/1998 |
| JP | 2001-158218 A | 6/2001 |
| WO | WO 01/34417 A1 | 5/2001 |
| WO | WO 01/47336 A2 | 7/2001 |

* cited by examiner

Section A-A

MODULAR HEATING AND/OR AIR CONDITIONING SYSTEM FOR A MOTOR VEHICLE

BACKGROUND

The invention relates to a heating and/or air conditioning system for a motor vehicle.

EP 0 799 734 A2 discloses a heating and/or air conditioning system having a housing for a motor vehicle, it being possible for the housing to be assembled in a modular construction from a plurality of housing segments, and the housing being assembled before being installed in the motor vehicle. The installation in the motor vehicle proves problematic if there are crossmembers or other subassemblies restricting the installation space.

SUMMARY

It is the object of the invention to develop a housing for a heating and/or air conditioning system for a motor vehicle in such a manner that the housing can be fitted into the motor vehicle in a simple manner and the functionality of the heating and/or air conditioning system can be expanded in a simple manner.

This object is achieved by a heating and/or air conditioning system disclosed herein. The following description relates to advantageous embodiments and developments of the invention.

The main concept of the invention resides in designing at least one housing segment of the housing for a heating and/or air conditioning system as an insert part, the insert part being inserted into the remaining housing only after the remaining housing is installed in the motor vehicle, the insert part comprising at least one additional functional subassembly. The design of at least one housing segment as an insert part makes it possible to fit the housing of the heating and/or air conditioning system in the motor vehicle in a simple manner despite there being obstacles in the fitting space. This is undertaken by the other housing segments which are not designed as an insert part firstly being put together to form a remaining housing, and the remaining housing then being positioned around an obstacle in the fitting space and being fitted in the motor vehicle. The obstacle may be, for example, a crossmember running through the fitting space. After the remaining housing is installed in the motor vehicle, the insert part is inserted into the remaining housing and fastened, thus completing the fitting-together of the housing of the heating and/or air conditioning system in the motor vehicle. In addition, further functional subassemblies are integrated in the insert part, so that the functionality of the air conditioning system can be expanded in a simple manner. In the simplest case, the insert part comprises at least one air-guiding means, for example an air-guiding element or an air inlet or an air outlet.

In another embodiment, the functional subassembly comprises at least one mixing flap, it also being possible for the drive for the at least one mixing flap to be designed as part of the functional subassembly.

In a particularly advantageous development of the invention, the functional subassembly is designed as a mixing module, the air which is thermally controlled by the mixing module being mixed, for example, for a rear region in the motor vehicle.

The abovementioned measures make it possible for the insert part, in addition to facilitating the installation of the heating and/or air conditioning system in the motor vehicle, to expand the functionality of the heating and/or air conditioning system in a simple manner by interchanging the insert part. The remaining housing is thus composed in an essentially identical manner for the different functionalities, for example for the embodiment as a single-zone air conditioning system or multi-zone air conditioning system (two-zone or three-zone or four-zone air conditioning system); the corresponding insert part is merely to be inserted into the remaining housing in order to realize the desired functionality. It is also conceivable, for easier installation of the housing of the heating and/or air conditioning system in the motor vehicle, for a plurality of housing segments to be designed as insert parts.

BRIEF DESCRIPTION OF THE DRAWINGS

The invention is explained in detail below using an exemplary embodiment and with reference to the drawings, in which.

DETAILED DESCRIPTION

Figure 1:
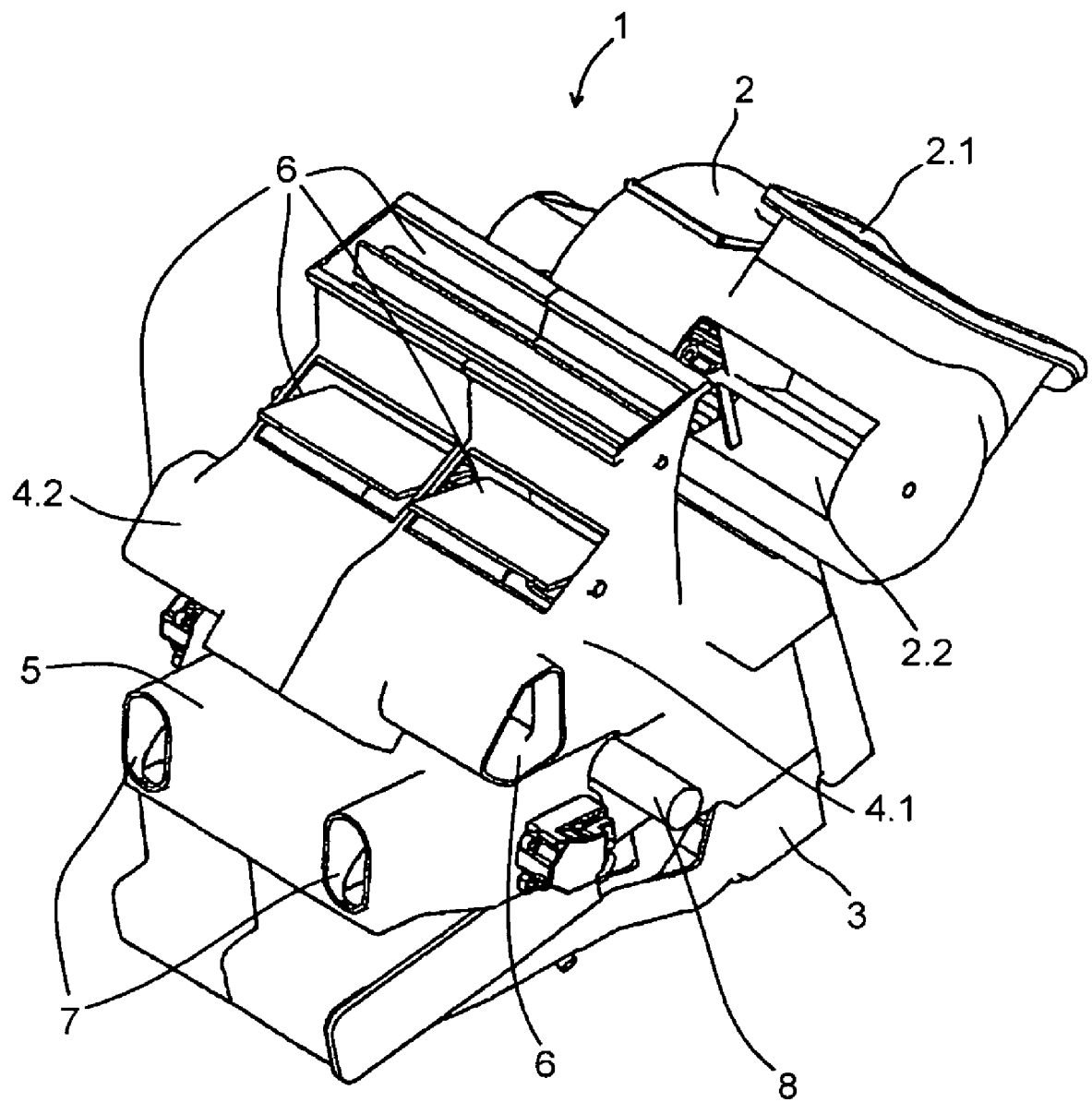
FIG. 1 shows a housing for a heating and/or air conditioning system.

FIG. 1 shows, in a schematic illustration, a housing 1 for a heating and/or air conditioning system. The housing 1 which is illustrated comprises a fan segment with a fresh air inlet 2.1 and a circulating-air inlet 2.2, a base segment 3, a right and a left air-distributing and heat-transfer segment 4.1, 4.2 and an insert part 5, the air-distributing and heat-transfer segments 4.1, 4.2 having corresponding air discharge openings 6, and the insert part 5 likewise having two air discharge openings 7. As FIG. 1 furthermore shows, in the exemplary embodiment illustrated the housing is arranged around a crossmember 8.

Figure 2:
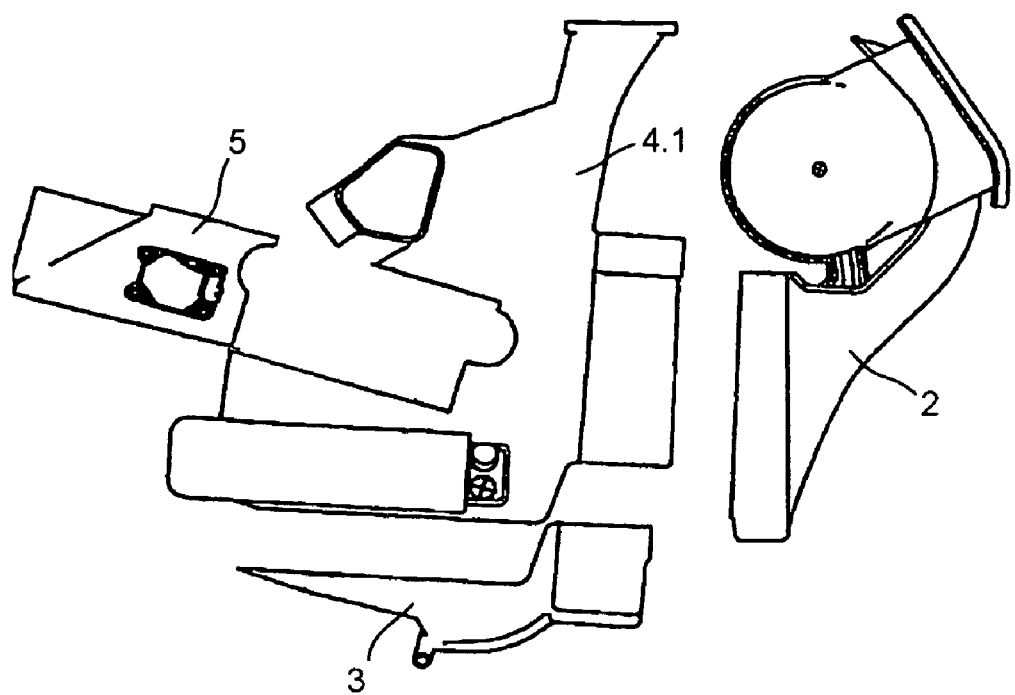
FIG. 2 shows a side view of the individual housing segments.

FIG. 2 shows a side view of the right air-distributing and heat-transfer segment 4.1, of the fan segment 2, the base segment 3 and of the insert part 5 before the housing for a heating and/or air conditioning system is fitted together.

Figure 3:
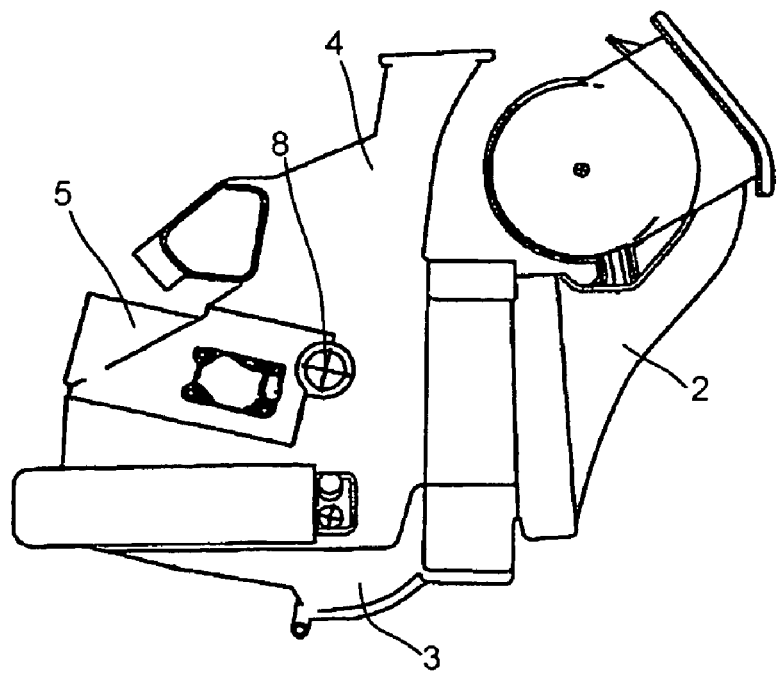
FIG. 3 shows a side view of the housing for a heating and/or air conditioning system.

FIG. 3 shows a side view of the housing 1 of a heating and/or air conditioning system for a motor vehicle, which housing is arranged around a crossmember 8 and has the insert part 5 already inserted.

Figure 4:
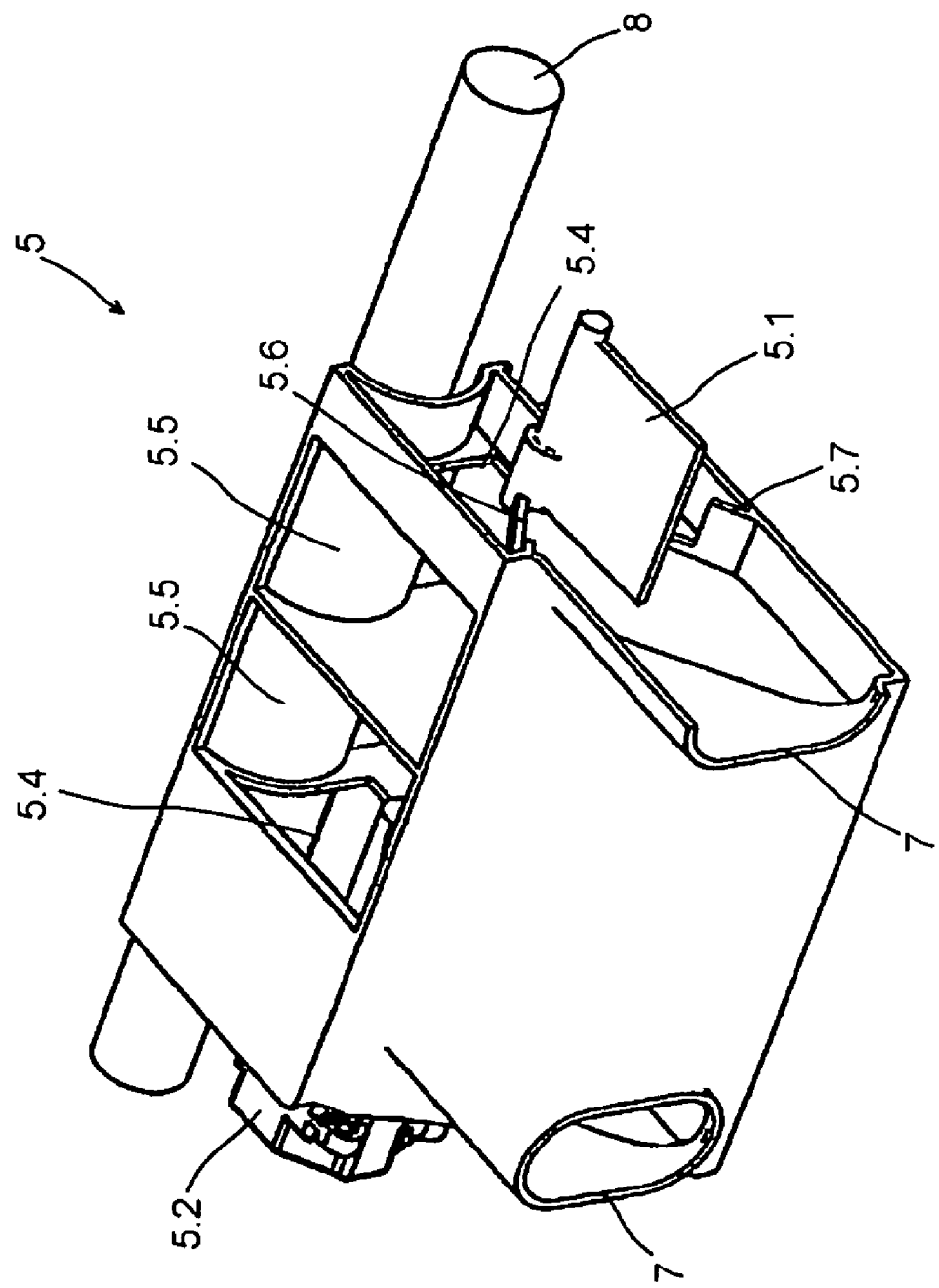
FIG. 4 shows an insert part.
Figure 5A:
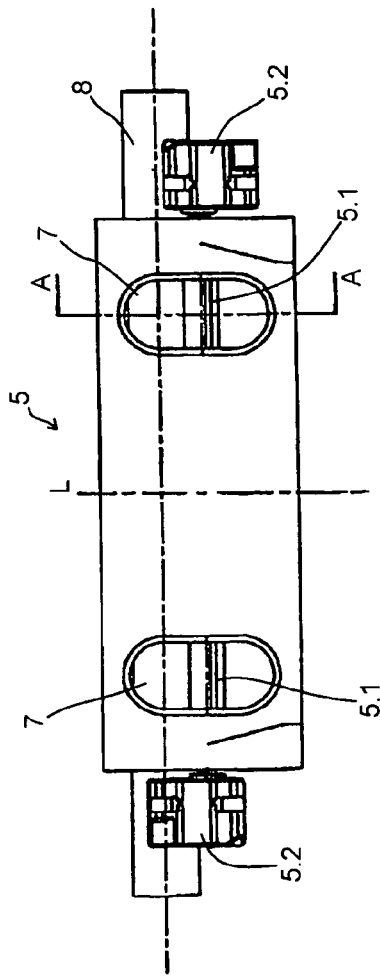
FIG. 5a shows a front view of the insert part.
Figure 5B:
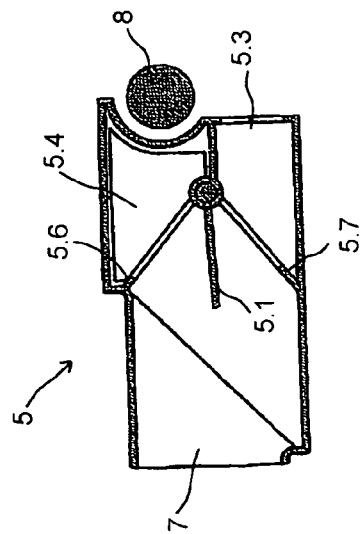
FIG. 5b shows a sectional illustration of the insert part along the section line A-A.

FIG. 4 shows, in a schematic illustration, the insert part 5, which is broken open on the right-hand side, and its position with respect to a crossmember 8 present in the fitting space. FIGS. 5a and 5b show a front view and a sectional drawing, respectively, of the insert part 5. In the exemplary embodiment illustrated, the insert part 5 which is necessary for installing the housing 1 on or around the crossmember 8 is designed as a mixing module. This mixing module is used, for example, for ventilating the rear zone of the vehicle (rear region), the B-pillar, the central vent on the central console or else for the footwell. As can be gathered from FIG. 5a, the insert part 5 is constructed symmetrically with respect to a longitudinal axis L and comprises two mixing flaps 5.1 for thermally controlling the air. The flaps 5.1 can be actuated by a continuous shaft with a motor or, as in the exemplary embodiment illustrated, by a respective motor 5.2 for separately setting the temperature on the right and left. There is a cold air supply 5.3 and a hot air supply 5.4 in each case in front of the mixing flaps 5.1. The mixing flaps 5.1 are illustrated in a central position, the movement of the mixing flaps 5.1 being limited by an upper end stop 5.6 (mixing position cold) and by a lower end stop 5.7 (mixing position hot). All of the hot air from a heating element (not illustrated) and from an optionally present PTC heater (likewise not illustrated) is guided through the mixing module 5 from bottom to top through two air ducts 5.5. The various air guides indicated above can be designed for ventilating the various zones of the vehicle as a function of the design of the insert part 5. Thus, for example, a two-zone heating and/or air conditioning system can be converted in a very simple manner by the insert part 5 illustrated into an at least three-zone heating and/or air conditioning system with thermally controllable ventilation of the rear or into a four-zone heating and/or air conditioning system, it being possible, in the case of the four-zone heating and/or air conditioning system, for the right and left rear regions to be ventilated separately and with differing thermal control, and it furthermore being possible for the same remaining housing to be used.

The invention claimed is:

1. A heating and/or air conditioning system for a motor vehicle, said heating and/or air conditioning system comprising:
    a housing which comprises a plurality of housing segments,
    wherein at least one of the housing segments is an insertion part which comprises at least one functional unit, with at least one means for air conduction, a warm air feed, a cold air feed, at least one mixer valve, or any combination thereof,
    wherein the insertion part can be inserted into a recessed receiving space in a remainder of the housing of the heating and/or air conditioning system such that a first plurality of external wall portions of the insertion part abut internal wall portions of the receiving space and such that a second plurality of external wall portions of the insertion part immediately adjacent to and bordering with portions of an external wall of the remainder of the housing will form an exterior surface of the housing along with the immediately adjacent and bordering portions of the external wall of the remainder of the housing,
    wherein the housing is configured to be installed on or about an obstacle that runs through the receiving space between the insertion part and the remainder of the housing.

2. The heating and/or air conditioning system in accordance with claim 1, wherein the functional unit is a mixer module for a rear area.

3. The heating and/or air conditioning system in accordance with claim 2, wherein the insertion part is configured symmetrically to a longitudinal axis of the insertion part.

4. The heating and/or air conditioning system in accordance with claim 1, wherein the functional unit comprises at least one drive for the at least one mixer mixing valve.

5. The heating and/or air conditioning system in accordance with claim 4, wherein the insertion part is configured symmetrically to a longitudinal axis of the insertion part.

6. The heating and/or air conditioning system in accordance with claim 1, wherein the insertion part is configured symmetrically to a longitudinal axis of the insertion part.

7. A motor vehicle comprising a heating and/or air conditioning system according to claim 1.

8. The heating and/or air conditioning system in accordance with claim 1, wherein the obstacle comprises a cross member that runs through the receiving space between the insertion part and the remainder of the housing such that the housing is configured to be installed on or about the cross member.

9. The heating and/or air conditioning system in accordance with claim 1, wherein the at least one functional unit comprises two mixing flaps for thermally controlling air, and wherein the remainder of the housing comprises two inlet openings and two discharge openings.

10. The heating and/or air conditioning system in accordance with claim 9, wherein the mixing flaps are actuatable by a continuous shaft with a motor.

11. The heating and/or air conditioning system in accordance with claim 1, wherein the insertion part comprises two air ducts formed in the insertion part such that the two air ducts run from a bottom side of the insertion part to a top side of the insertion part.

12. The heating and/or air conditioning system in accordance with claim 1, wherein the insertion part further comprises two air discharge openings.

13. A heating and/or air conditioning system for a motor vehicle, comprising:
    a housing which comprises a plurality of housing segments,
    wherein at least one of the housing segments is an insertion part,
    wherein the insertion part can be inserted into a recessed receiving space in a remainder of the housing of the heating and/or air conditioning system such that a first plurality of external wall portions of the insertion part abut internal wall portions of the receiving space and such that a second plurality of external wall portions of the insertion part adjacent to portions of an external wall of the remainder of the housing will form an exterior surface of the housing along with the adjacent portions of the external wall of the remainder of the housing,
    wherein the insertion part comprises two mixing flaps for thermally controlling air, and
    wherein the remainder of the housing comprises two inlet openings and two discharge openings.

14. The heating and/or air conditioning system in accordance with claim 13, wherein the mixing flaps are actuatable by a continuous shaft with a motor.

15. The heating and/or air conditioning system in accordance with claim 13, wherein the insertion part comprises two air ducts formed in the insertion part such that the two air ducts run from a bottom side of the insertion part to a top side of the insertion part.

16. The heating and/or air conditioning system in accordance with claim 15, wherein the insertion part further comprises two air discharge openings.

17. The heating and/or air conditioning system in accordance with claim 13, wherein movement of each mixing flap is limited by an upper end stop and a lower end stop.

18. The heating and/or air conditioning system in accordance with claim 13, wherein the insertion part is configured symmetrically to a longitudinal axis of the insertion part.

19. The heating and/or air conditioning system in accordance with claim 13, wherein the housing is configured to be installed on or about an obstacle that runs through the receiving space between the insertion part and the remainder of the housing.

* * * * *